United States Patent [19]

Saito et al.

[11] Patent Number: 5,105,072

[45] Date of Patent: Apr. 14, 1992

[54] OPTICAL INFORMATION RECORDING/REPRODUCING APPARATUS HAVING STOPPING POSITION DEVIATION AND CORRECTION CIRCUITRY RELATIVE TO MOVEMENT IN THE TRACK DIRECTION

[75] Inventors: Akito Saito, Hino; Yuichiro Akatsuka, Tama; Takashi Hamaoka, Hino, all of

[73] Assignee: Olympus Optical Co., Ltd., Tokyo, Japan

[21] Appl. No.: 665,896

[22] Filed: Mar. 6, 1991

[51] Int. Cl.[5] .................. G06K 13/06; G06K 7/01
[52] U.S. Cl. ...................... 235/476; 235/483;
                               235/454; 369/32; 369/47
[58] Field of Search .............. 369/32, 44.39, 44.32,
     369/44.33, 124, 58, 54, 47, 48, 44.27, 44.28,
         44.35; 235/454, 476, 479, 483; 360/2

[56] References Cited

U.S. PATENT DOCUMENTS

| 4,634,850 | 1/1987 | Pierce et al. | 369/32 |
| 4,885,458 | 12/1989 | Horiguchi et al. | 369/44.39 |
| 4,950,876 | 8/1990 | Saito | 235/476 |
| 4,982,391 | 1/1991 | Sakagami et al. | 369/32 |
| 4,982,393 | 1/1991 | Matsushita et al. | 369/44.32 |
| 5,008,552 | 4/1991 | Kuramochu et al. | 235/454 |

Primary Examiner—Roy N. Envall, Jr.
Assistant Examiner—Thang V. Tran
Attorney, Agent, or Firm—Stevens, Davis, Miller & Mosher

[57] ABSTRACT

An optical information recording and/or reproducing apparatus is provided wherein an information recording medium and an optical head are moved relatively in a track direction in a reciprocal manner to record optical information on the information recording medium and/or reproducing optical information recorded on the information recording medium. The apparatus is arranged such that when a defect is formed on a stopping position of the relative movement of the optical information recording medium and the optical head, the optical information recording medium or the optical head is stopped at a deviated position from the predetermined stopping position; and the deviated distance of the relative movement of the optical information recording medium and the optical head is corrected when relative movement between the optical information recording medium and the optical head is resumed in an opposite direction to the previous relative movement direction.

24 Claims, 8 Drawing Sheets

FIG. 1 PRIOR ART

FIG_2 PRIOR ART

OPTICAL INFORMATION RECORDING/REPRODUCING APPARATUS HAVING STOPPING POSITION DEVIATION AND CORRECTION CIRCUITRY RELATIVE TO MOVEMENT IN THE TRACK DIRECTION

BACKGROUND OF THE INVENTION (1.) Field of the Invention

The present invention relates to an optical information recording and/or reproducing apparatus in which optical information is recorded and/or reproduced with the aid of an information recording medium such as an optical card. In the apparatus according to the invention, the optical card and an optical head are moved relatively in a track direction, which is parallel to the extending direction of tracks formed on the optical card, to record optical information on the optical card and/or reproduce optical information recorded on the optical card; additionally the relative moving speed between the optical card and the optical head is controlled at a given speed in order to prevent errors in recording and/or reproducing optical information on the optical card.

(2.) Prior Art Statement

On the optical information recording medium such as an optical card, it is impossible to rewrite optical information, which had already been written thereon. But the optical card has a great memory capacity, i.e. about several thousand times to ten thousand times as large as that of a magnetic card. The optical card has its memory capacity of about from one to two mega bytes, so that a great number of applications such as a bankbook, a pocket map and a prepaid card for shopping can be considered.

Figure 1:
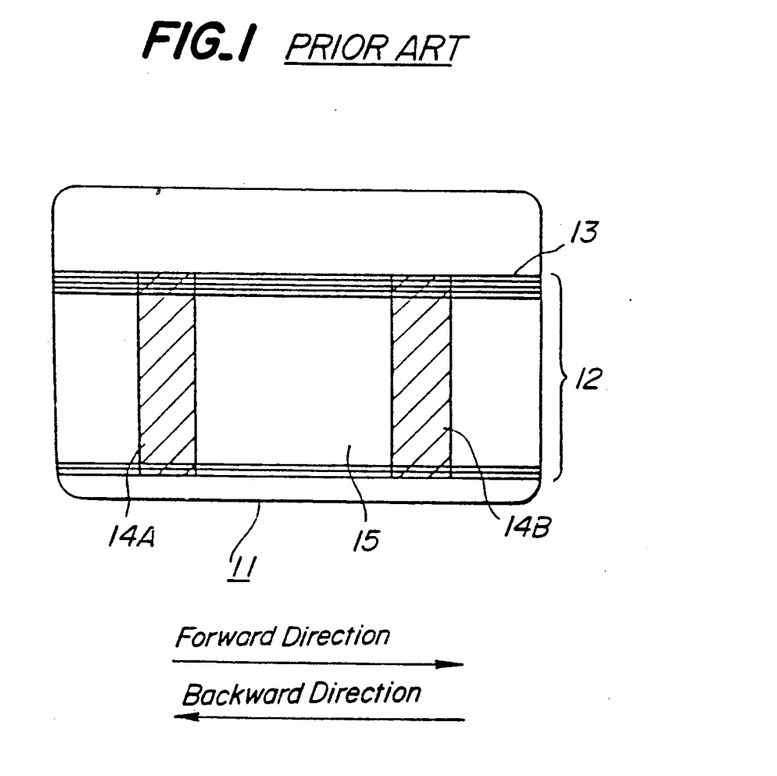
FIG. 1 is a schematic view showing an optical card which is commonly used in the conventional optical information recording/reproducing apparatus and the apparatus according to the invention as an optical information recording medium.

Many optical card constructions have been suggested; and one of the constructions of the optical card, which has been suggested by the applicant in Japanese Preliminarily Laid-open Publication No. 63-37876, is shown in FIG. 1. On the optical card 11, there is provided an optical information recording portion 12. The optical information recording portion 12 comprises a plurality of tracks 13 which are formed in a longitudinal direction of the optical card 11, being parallel to each other. On both sides of the optical information recording portion 12, there are arranged ID portions 14A and 14B, respectively. In each ID portion 14A and 14B, address information corresponding to each track 13 is recorded. Since the ID portions 14A and 14B are provided on both sides of the optical card 11, the address information recorded thereon can be read out even when the optical card 11 is moved with respect to the optical head either from right side to left side or from left side to right side. As is apparent from FIG. 1, the ID portions 14A and 14B are arranged inside by a given distance, for instance 4 mm, from both ends of the optical card 11 in order to prevent the influence of a defect or dirt formed on the edge portions of the optical card 11 and in order to relatively move the optical card and the optical head at a constant speed between ID portions 14A and 14B. When recording and/or reproducing optical information on the optical card 11 from left to right (forward direction), the address information recorded on the left side ID portion 14A is read out to identify the position of the optical head with respect to the optical card; and when recording and/or reproducing optical information on the optical card 11 from right to left (backward direction), the address information recorded on the right side ID portion 14B is read out.

Figure 2:
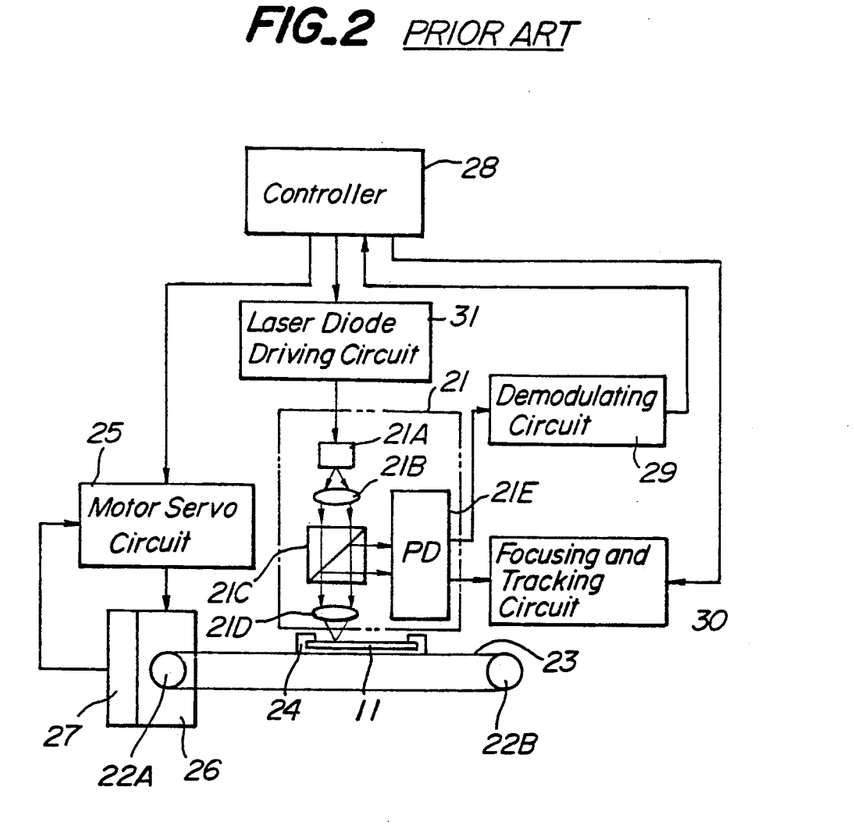
FIG. 2 is a block diagram depicting the whole construction of the conventional optical information recording/reproducing apparatus.

FIG. 2 is a block diagram showing the whole construction of a conventional optical information recording/reproducing apparatus. In the apparatus shown in FIG. 2, it is arranged such that an optical card 11 is reciprocally transferred in a track direction, which extends parallel to the tracks formed on the optical card 11, and an optical head 21 is moved in a tracking direction, which is perpendicular to the track direction, to record optical data on the optical card 11 and/or reproduce optical data recorded on the optical card 11. The optical card 11 is mounted on a shuttle 24 which is arranged on a transfer belt 23. The transfer belt 23 is passed round pulleys 22A and 22B. The shuttle 24 is arranged to be reciprocally transferred in the track direction by means of a motor 26. The moving speed of the shuttle 24 is controlled by a motor servo circuit 25 made constant at a predetermined speed. A rotary encoder 27 is arranged to a shaft of the motor 26 in order to detect a position of the shuttle 24 with respect to the optical head 21. It is arranged such that one pulse of the rotary encoder 27 corresponds to 50 μm of a moving distance of the shuttle 24. Positional information of the shuttle 24 is supplied to a controller 28 via the motor servo circuit 25; and the controller 28 supplies an order to said motor servo circuit 25 to move the shuttle 24 at a given constant speed during which a light beam emanated from the optical head 21 is traced onto the information recording area 15, provided between ID portions 14A and 14B.

Figure 3:
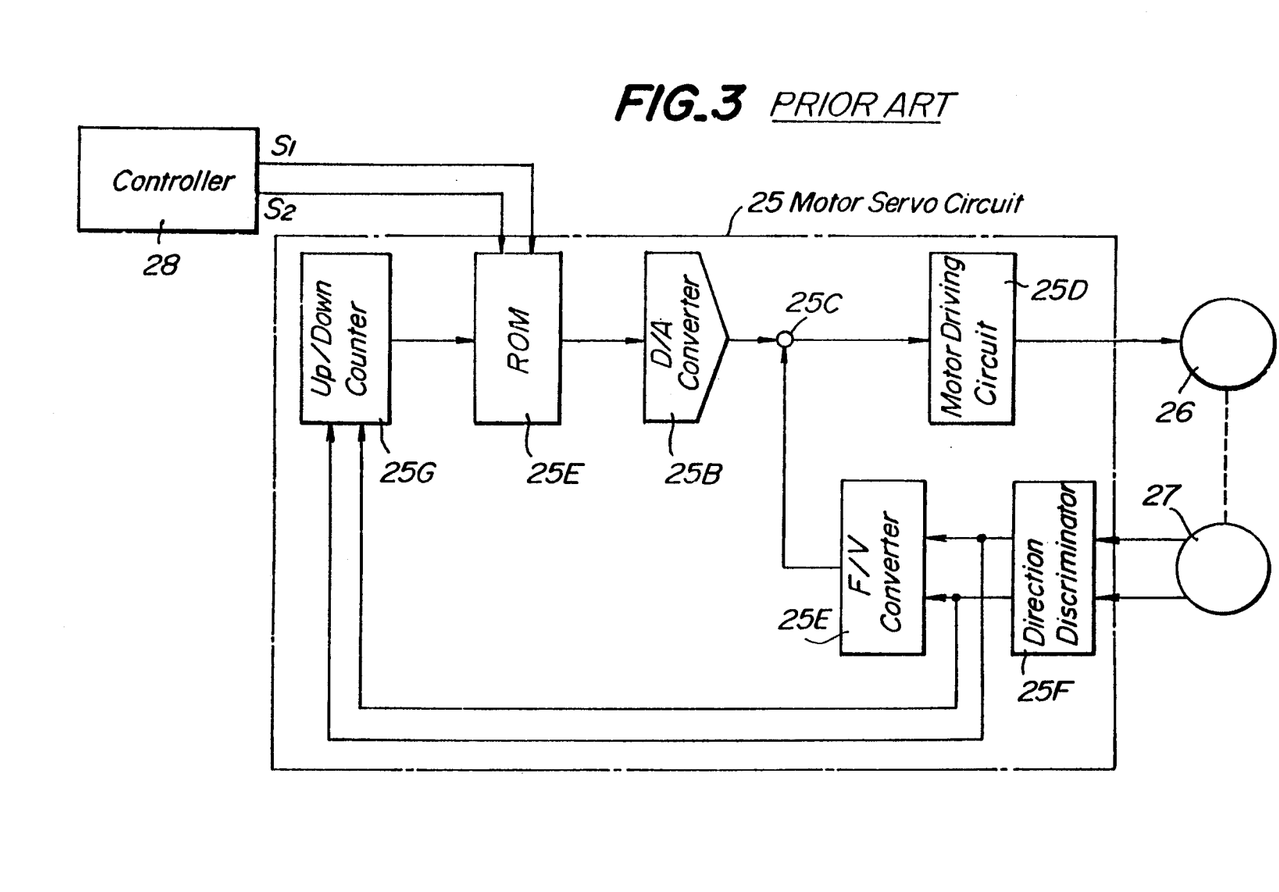
FIG. 3 is a block diagram illustrating a motor servo circuit provided in the conventional optical information recording/reproducing apparatus.

FIG. 3 is a block diagram showing a circuit construction of the motor servo circuit 25. The motor servo circuit 25 comprises a ROM 25A, a D/A converter 25B, a subtracter 25C, a motor driving circuit 25B, an F/V converter 25E, a direction discriminator 25F and an up and down counter 25G.

The shuttle 24 is reciprocally moved in the track direction by means of the motor 26. In the ROM 25A, when a driving signal S1 and a driving direction signal S2 for determining the moving direction of the shuttle 24 is supplied from the controller 28, an address of the ROM 25A is determined. One address in ROM 25A is arranged to correspond to a moving distance of 50 μm of the shuttle 24. Then a driving data (target speed) of the shuttle 24 memorized in ROM 25A is supplied to the motor 26 via the D/A converter 25B and the motor driving circuit 25D. The shuttle 24 is moved in the forward direction in response to the signal from ROM 25A; thereafter an A phase output or B phase output of the rotary encoder 27, which is provided on the same shaft of the motor 26, is supplied to the direction discriminator 25D; additionally an output of the discriminator 25D is supplied to the F/V convertor 25E and the up and down counter 25G. In the up and down counter 25G, whose output indicates the position of the shuttle 24 with respect to the optical head 21, the counted value is made clear when the phase of the output of the direction discriminator 25D is changed. The output of the F/V convertor 25E is further supplied to a subtracter 25C, in which a difference between the output of the F/V convertor 25E and the D/A convertor 25B is detected. The rotation of the motor 26, i.e. the moving speed of the shuttle 24, is controlled in the motor driving circuit 25D so as to make the difference zero. In such manner, the moving speed of the shuttle 24 is controlled at the target speed during which the optical head 21 is moved between the ID portions 14A and 14B.

From the ROM 25A, output data is supplied to the motor driving circuit 25D such that: when the shuttle 24 is moved such that the optical head 21 passes a left side accelerating area of the optical card 11, i.e. left side area of the left side ID portion 14A, the shuttle 24 is moved to be accelerated, then after the optical head 21 passes over the left side accelerating area of the optical card 11, in other words, after the number of pulses counted in the up and down counter 25G becomes higher than a predetermining value representing that the optical head 21 passes over the accelerating area of the optical card 11, the shuttle 24 moves at a constant speed between the left side ID portion 14A and the right side ID portion 14B; when the optical head 21 becomes to the right side decelerating area, i.e. right side area of the right side ID portion 14B, the shuttle 24 is decelerated. Thereafter, data representing that the movement speed of the shuttle is zero are supplied from the ROM 21A to the motor driving circuit 25D to stop the shuttle 24 when the member of pulses counted in the up and down counter 25G becomes to a given value.

In order to transfer the shuttle 24 in the backward direction, the reversed driving direction signal and the driving signal may be supplied to ROM 25A of the motor servo circuit 25 from the controller 28.

The optical head 21 comprises a laser diode 21A as a light source, a collimator lens 21B, a prism 21C, an objective lens 21D and a photodetector 21E. The laser beam for writing/reading information emanated from the laser diode 21A is made incident upon the optical card 11 via the collimator lens 21B, the prism 21C and the objective lens 21D; and then the light beam is reflected by the optical card 11 and made incident upon the photodetector 21E after the direction thereof is changed 90 degrees by means of the prism 21C.

The output of the photodetector 21E is supplied to a demodulating circuit 29 to obtain an information reproducing signal therefrom and the output is also supplied to a focusing and tracking servo circuit 30 to detect a focusing error signal and a tracking error signal. The optical head 21 is driven in focusing and tracking directions in accordance with the focusing error signal and the tracking error signal detected by the focusing and tracking servo circuit 30 in order to let the incident light beam always trace on the track 13 in a focused condition.

The controller 28 is connected to the laser diode 21A via a laser diode driving circuit 31. When information data recorded on the optical card 11 is read out, the laser diode driving circuit 31 supplies an order to the laser diode 11 to produce a light beam having a low power for reading information recorded on the optical card 11 under the control of the controller 28. The controller 28 is also connected to the motor servo circuit 25, the demodulating circuit 29 and the focusing/tracking servo circuit 30. The driving modes of these circuits are controlled by the controller 28 such that a desired track is sought in accordance with track address information demodulated by the demodulating circuit 29 to reproduce optical information recorded on the relevant track and/or to record optical information thereon.

When optical information is recorded on the optical card 11, a laser beam, which is modulated in accordance with the writing data, having a high power emitted from the laser diode 21A via the laser driving circuit 31 is illuminated on the optical card 11, after the relevant track is sought.

In the conventional optical information recording/reproducing apparatus described above, when the driving direction of the shuttle 24 is turned, the shuttle 24 is stopped once; in other words, the moving speed of the shuttle 24 is controlled so as to become zero when the driving direction is changed. However, if a defect such as dust and flaw is formed on a stopping position of the shuttle 21 where the light beam emanated from the optical head 21 is illuminated, the tracking error signal would not be obtained correctly due to the defect. Therefore, the tracking servo system of the apparatus cannot serve normally, so that the light beam cannot trace the desired track.

SUMMARY OF THE INVENTION

The present invention has for its object to provide an optical information recording/reproducing apparatus, in which the tracking servo system serves correctly and thus the light beam can trace the desired track in an effective manner even when a defect is formed on the stopping position of the relative movement of the optical card and the optical head, at which the light beam emanated from the optical head is illuminated.

In order to carry out this object, the optical information recording and/or reproducing apparatus according to the invention, wherein an information recording medium and an optical head are moved relatively in a track direction to record optical information on the information recording medium and/or reproducing optical information recorded on the information recording medium, comprises:

driving means for moving relatively an optical information recording medium and an optical head in the track direction in a reciprocal manner;

servo means for controlling a relative moving speed of the optical recording medium and the optical head;

defect detecting means for detecting a defect formed on a predetermined stopping position of the relative movement of the optical information recording medium and the optical head, when the optical information recording medium or the optical head is relatively moved in a first direction;

stopping position deviating and correcting means for deviating the stopping position of the relative movement of the optical information recording medium and the optical head by some distance when the defect formed on the predetermined stopping position is detected by said defect detecting means; and for correcting the deviated relative moving distance of the optical information recording means and the optical head when the optical information recording medium or the optical head is relatively moved in a second direction which is opposite to said first direction; and controlling means for controlling the servo operation conducted in the servo means and for controlling the deviating and correcting operation for the stopping position conducted in the stopping position deviating and correcting means.

In the apparatus according to the invention, it is arranged that when the fact that the defect is formed at the predetermined stopping position of the relative movement of the optical information recording medium and the optical head is detected, the controlling means controls the relative moving distance of the information recording medium and the optical head is deviated from the predetermined stopping position.

DETAILED DESCRIPTION OF THE PREFERRED EMBODIMENTS

Figure 4:
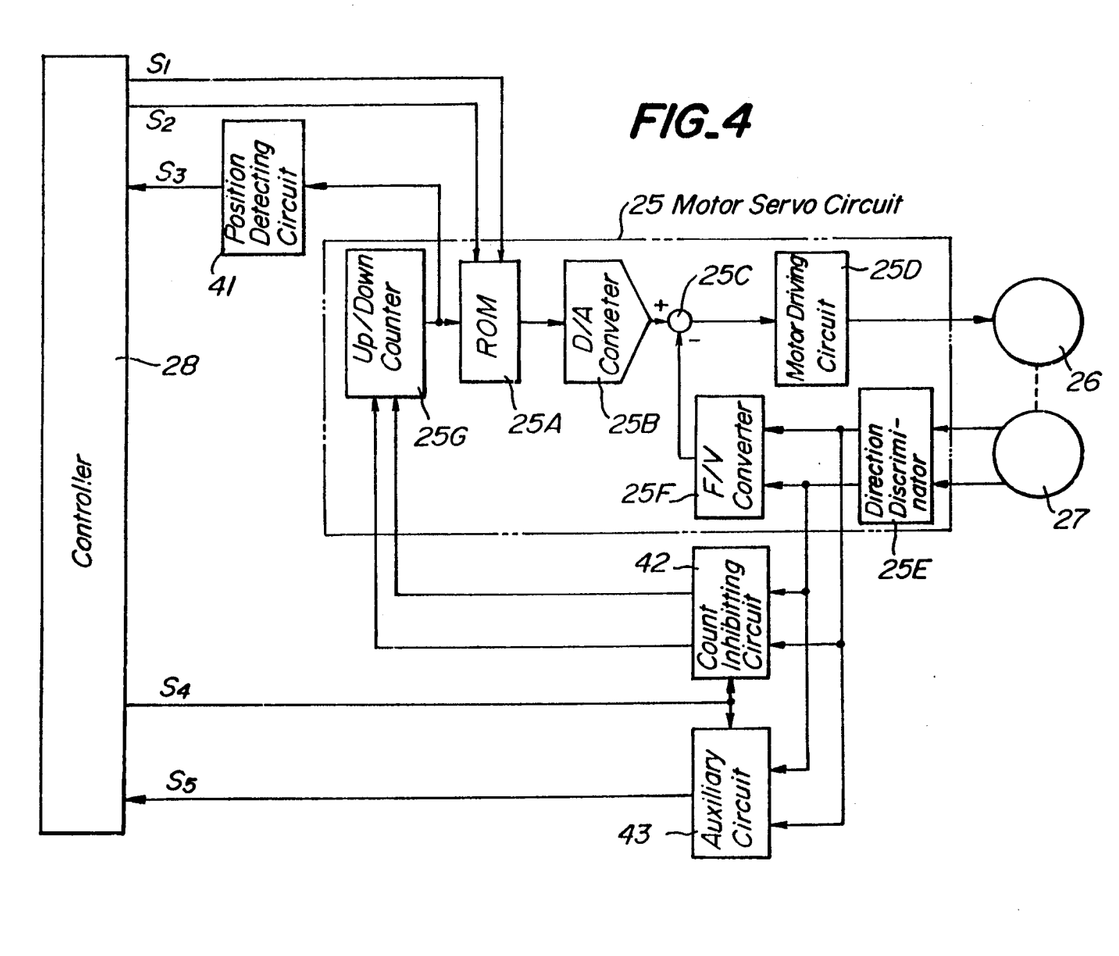
FIG. 4 is a block diagram representing a construction of the main portion of a first embodiment of the optical information recording/reproducing apparatus according to the invention.

FIG. 4 is a block diagram showing a construction of the main portion of the optical information recording-/reproducing apparatus according to the first embodiment of the invention. The apparatus according to the first embodiment comprises a position detecting circuit 41 for detecting the fact that the relative position of an optical card 11 and the optical head 21 becomes to top end portions of ID portions 14A and 14B, in the other words, for detecting the fact that the shuttle 24 is transferred in the track direction at a constant speed under the control of the motor servo circuit 25; a count inhibiting circuit 42 for inhibiting to count clock pulses in the up and down counter 25G of the motor servo circuit 25; and an auxiliary counter 43 for counting clock pulses during when the counting operation is inhibited in the up and down counter 25G; in addition to the motor servo circuit 25 of the conventional apparatus, which has been explained in the above.

In the position detecting circuit 41, an output of the up and down counter 25G of the motor servo circuit 25 is decoded to detect the position of the shuttle 24, being transferred at a constant speed with respect to the optical head 21 under the control of the motor servo circuit 25; and an output of the position detecting circuit, i.e. a positional signal $S_3$ representing the position of the ID portions with respect to the optical head 21, is supplied to the controller 28. The A phase signal and the B phase signal are supplied to the up and down counter 25G from the direction discriminator 25F via the counting inhibiting circuit 42. The count inhibiting circuit 42 serves to inhibit the supply of the clock pulses corresponding to the A phase signal and the B phase signal of the direction discriminator 25F in accordance with a count inhibiting signal $S_4$ supplied from the controller 28. The count inhibiting signal $S_4$ is also supplied to the auxiliary counter 43, in which the A phase signal and the B phase signal supplied from the direction discriminator 25F are counted during the counting the clock pulse is inhibited in the count inhibiting circuit 42; and the number of pulses counted in the auxiliary counter 43 is supplied to the controller 28.

In the controller 28, a track address data of the ID portion 14A or the ID portion 14B are read out; then, when the fact is detected that the light beam illuminated on the optical card 11 is deviated from the desired track due to the defect, a seeking operation for obtaining the desired track is conducted again; and then the count inhibiting signal $S_4$ is supplied to the count inhibiting circuit 42 to deviate the stopping position of the shuttle 24 from the predetermined stopping position in the track direction by some distance. In the second transferring operation of the shuttle 24, since the stopping position of the optical card 11 with respect to the optical head 21 is deviated from the predetermined position in the track direction, the desired track is kept by the light beam without being influenced by the defect formed on the predetermined stopping position. Since the dimension of the defect formed on the optical card 11 is generally about 10 μm, if the stopping position of the shuttle 24 is deviated by about 100 μm, it is possible to prevent that the shuttle 24 is stopped just on the predetermined stopping position and the desired track is not traced by the light beam. In order to deviate the stopping position of the shuttle 24 by 100 μm, it may be effective to inhibit to supply two pulses to the up and down counter 25G, since one pulse of the rotary encoder 27 corresponds to a transferred distance of 50 μm of the shuttle 24. It is preferred to inhibit the supply of the pulses to the up and down counter when the shuttle 24 is moved at a constant speed, i.e. when the shuttle 24 is transferred between the right and left ID portions 14A and 14B, in order to decrease an influence to the servo system for the inhibition of the pulses.

For example, the operation of the apparatus for the occasion that the defect is formed at the right side predetermined stopping position will be explained below, making reference to the FIGS. 5A to 5D.

Figure 5A:
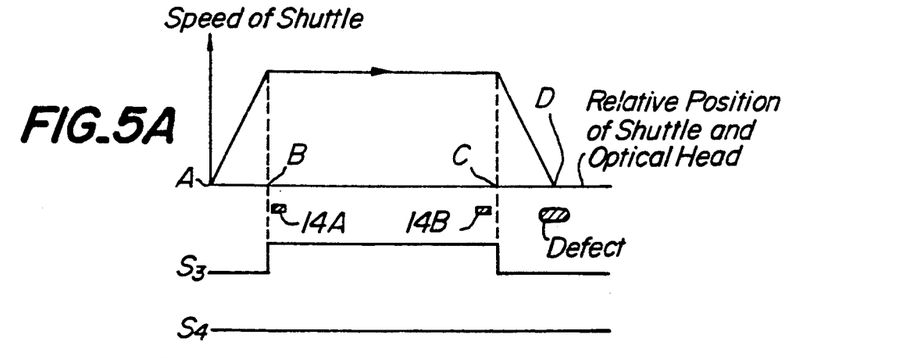
FIGS. 5A to 5D are waveforms for explaining a movement of the apparatus according to the first embodiment.

In FIG. 5A, in response to the driving direction signal $S_2$ supplied from the controller 28, the shuttle 24 is moved in the forward direction (from Point A to Point B) by means of the motor 26; when the optical card 11 mounted in the shuttle 24 has passed the accelerating area (from Point A and Point B) with respect to the optical head 21 and then the relative position of the optical card 11 and the optical head 21 becomes to the left side ID portion 14A, track address information of the ID portion 14A is read out and the positional signal $S_3$ is supplied to the controller 28. In the controller 28, the fact is recognized that the track address information corresponds to the desired track. When the shuttle 24 has passed the constant speed area (from Point B to Point C) and then has become to the decelerating area (from Point C to Point D), the output of the ROM 25A is changed from the constant speed data to the decelerate speed data; and when a predetermined number of pulses are counted in the up and down counter 25G (Point D), the driving speed data of zero is supplied to the motor driving circuit 5D from ROM 25A via the D/A converter 25B to stop the relative movement of the shuttle 24 and the optical head 21 (Point D). In this case, since the defect is formed just on the predetermined stopping position (Point D), the tracking error signal cannot be produced correctly in the focusing and tracking circuit 30, so that the light beam emanated from the optical head 21 is out of the desired track. It should be noted that the positional signal is activated during the shuttle 24 is moved between the constant speed area, i.e. from Point B to Point C; and the count inhibiting signal $S_4$ is not activated during this movement of the shuttle 24.

Figure 5B:
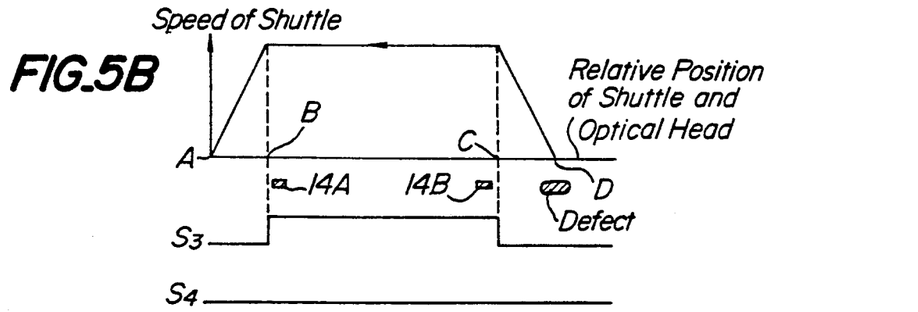

The next relative movement of the shuttle 24 and the optical head 21 is represented in FIG. 5B. In the controller 28, the level of the driving direction signal $S_2$ supplied to the motor servo circuit 25 is turned to move the shuttle 24 in the backward direction (from Point D to Point A). It should be noted that the light beam emanated from the optical head 21 has been out of the desired track at this point. When the relative position of the optical card 11 and the optical head 21 has passed the accelerated area (from Point D to Point C) and becomes to the right side ID portion 14B, the controller 28 recognizes the fact that the desired track is not traced by the light beam from the track address information of the ID portion 14. After passing the constant speed area (from Point C to Point B) and when the shuttle 24 comes to the decelerated area (from Point B to Point A), the output of the ROM 25A is changed from the constant speed data to the decelerate speed data; and when the number of pulses counted in the up and down counter 25G becomes a predetermined value (Point A), the driving speed data of zero is supplied from the ROM 25G to the motor driving circuit 25D to stop the shuttle 24.

In the operation explained in the above, the fact is judged in the controller 28 that there is formed the defect just on the right side stopping position of the shuttle 24, and the desired track is not traced by the light beam emanated from the optical head 21 when the shuttle 24 is turned to the backward direction. Thereafter, the desired track is sought again, the next movement of the shuttle 24 in the forward direction is arranged to stop the shuttle 24 such that the light beam is not made incident upon the defect when the shuttle 24 is stopped to change its direction. That is to say, the movement of the shuttle 24 is arranged such that the moving distance of the shuttle 24 in the forward direction is extended by 100 μm in comparison with the moving distance in the operation explained in FIG. 5A.

Figure 5C:
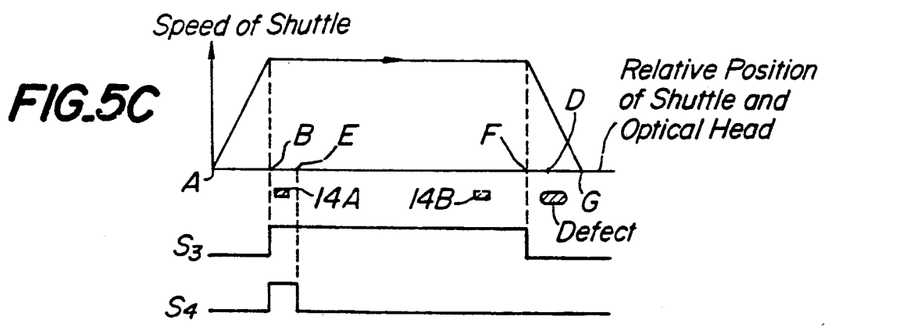

After the desired track is sought again, the shuttle 24 is transferred in the forward direction again. The movement of the shuttle 24 in this operation is shown in FIG. 5C. When the fact that the shuttle 24 is moved to Point B is recognized in the controller 28, the count inhibiting signal $S_4$ is supplied to the count inhibiting circuit 41 and to the auxiliary counter 43. Then, the supply of the clock pulse to the up and down counter 25G is inhibited, while the pulse counting is started in the auxiliary counter 43. The number of pulses counted in the auxiliary counter 25G is supplied to the controller 28 as an auxiliary counting signal $S_5$; when the counted value becomes two, the supply of the count inhibiting signal $S_3$ to the count inhibiting circuit 42 and to the auxiliary counter 43 is stopped by the controller 28, and the clock pulse corresponding to the A phase signal or B phase signal of the direction discriminator 25F is started to be counted in the up and down counter again. Therefore, the moving distance of the shuttle 24 is extended by 100 μm when the shuttle 24 is transferred at the constant speed from Point B to Point E. Thus, an actual stopping point G of the shuttle 24 is deviated from the predetermined stopping point D, at which the defect is formed.

Figure 5D:
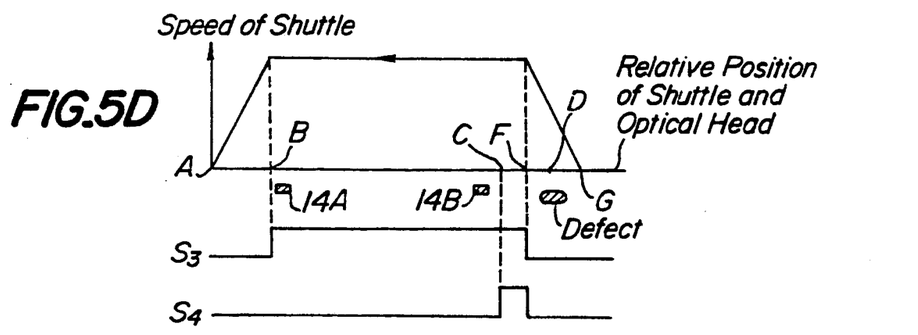

In order to correct the extended moving distance of the shuttle 24, when the shuttle 24 is returned in the backward direction, the supply of the clock pulse to the up and down counter 25G is inhibited again during a period corresponding to two pulses, as shown in FIG. 5D.

In the above explanation, the case that the defect is formed at the predetermined stopping position D, at which the shuttle 24 is stopped after the shuttle 24 is moved in the forward direction, is explained. However, in the case that the defect is formed at the stopping position A, at which the shuttle 24 is stopped after moving in the backward direction, it is possible to prevent that the tracking servo system does not serve correctly due to the defect by conducting the operations explained in the above in a reversed manner.

Figure 6:
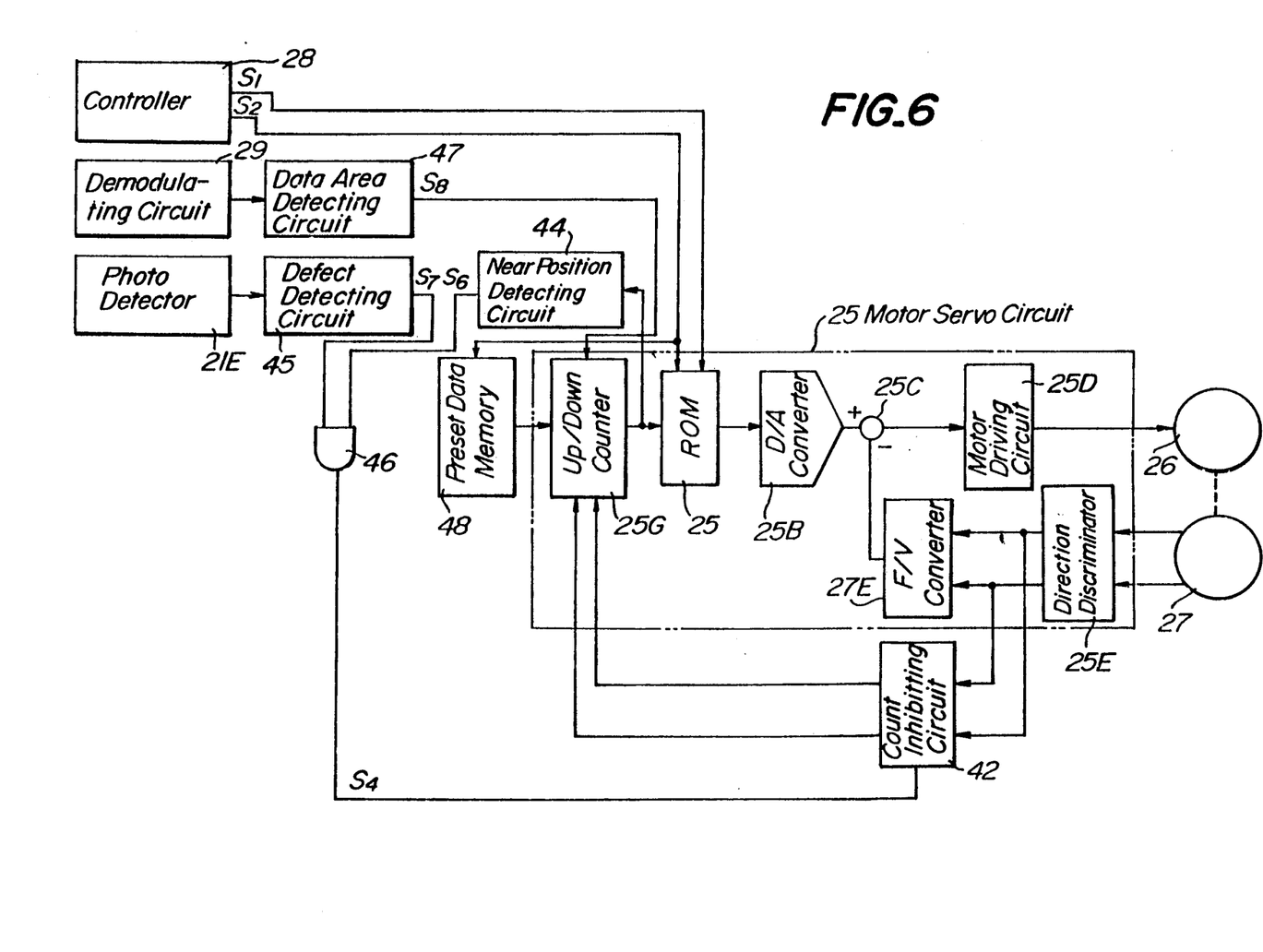
FIG. 6 is a block diagram showing a construction of the main portion of a second embodiment of the optical information recording/reproducing apparatus according to the invention.

FIG. 6 is a block diagram illustrating a main construction of the second embodiment of the present invention. In the embodiment explained hereinafter, the same numerical numbers are used for the elements which correspond to the same elements of the first embodiment shown in FIG. 4.

In the second embodiment, there are provided a near position detecting circuit 44, a defect detecting circuit 45, an AND circuit 46, the count inhibiting circuit 42 and a data area detecting circuit 47 and a preset data memory 48, in addition to the motor servo circuit 25 shown in FIG. 3.

In the near position detecting circuit 44, the output of the up and down counter 25G is decoded; and the fact that the shuttle 24 is moved to some distance short of the predetermined stopping position, for instance, 100 μm short of the predetermined stopping position, is detected. The output signal of the near portion detecting circuit 44 is supplied to one of the input terminals of the AND circuit 46.

To the defect detecting circuit 45, is supplied an output of the photodetector 21E provided in the optical head 21. In the defect detecting circuit 45, the existence of the defect formed on the optical card 11 is detected on the basis of the signal level of the output of the photodetector 21E; the output signal of the defect detecting circuit 45 is supplied to the other input terminal of the AND circuit 46.

An output of the AND circuit 46 is supplied to the count inhibiting circuit 42 as a count inhibiting signal $S_4$, which is activated only when the defect is formed in the vicinity of the predetermined stopping position. To the count inhibiting circuit 42, up-clock pulses and down-clock pulses are supplied from the direction discriminator 25E; when the count inhibiting signal $S_4$ supplied to the count inhibiting circuit 42 is low level, these pulses are supplied to the up and down counter 25G, but when the count inhibiting signal $S_4$ supplied thereto is high level, it is inhibited to supply the pulses to the up and down counter 25G.

In the data area detecting circuit 47, the fact is detected on the basis of bivalent signal supplied from the demodulating circuit 29 that the relative position of the optical card 11 and the optical head 21 becomes to data area of the optical card 11, on which information data has been recorded. It should be noted that the data area comprises the ID portions 14A and 14B and data portion 15. The output signal of the data area detecting circuit 47 is arranged to be supplied to the up and down counter 25G. In the preset data memory 48, data representing top end portions of the ID portions 14A and 14B of the optical card 11 are preliminarily memorized. Further, it is arranged such that the driving direction signal $S_2$ is supplied from the controller 28 to the preset data memory 48; and that the output of the preset data memory 48 is supplied to the up and down counter 25G. In the up and down counter 25G, the data of the top end portion of any one of the ID portions 14A and 14B is set up in accordance with the driving direction signal supplied from the controller 28, when the data area signal $S_8$ is supplied to the up and down counter 25G from the data area detecting circuit 47.

It should be noted that the defect detecting signal $S_6$ generated in the defect detecting circuit 45 is further supplied to the focusing and tracking servo circuit 30 (not shown). The focusing and tracking servo circuit 30 is arranged such that a lower composition of the tracking error signal is kept during when the defect is detected by the defect detecting circuit 45 in order to prevent that the tracking servo system cannot effect when the defect is detected by the defect detecting circuit 45.

The movement of the shuttle 24 in the second embodiment will be explained in the following, making reference to FIGS. 7A to 7D.

When the driving signal $S_1$ and the driving direction signal $S_2$ are supplied to the ROM 25A, the shuttle 24 is started to move from Point A in the forward direction by means of the driving motor 26; and then accelerated thereby. When the light beam emanated from the optical head 21 becomes to the ID portion 14A or 14B of the optical card 11, the data area detecting signal $S_8$ is generated in the data area detecting circuit 47 in accordance with the output of the photodetector 21E of the optical head 21. Responding to the data area detecting signal $S_8$, the preset data which is preliminarily memorized in the preset data memory 48 is set in the up and down counter 25G in accordance with the moving direction of the shuttle 24. The preset data is for representing the top end portion of the ID portion 14A or 14B, as stated in the above; the shuttle 24 starts to move at a constant speed when the data area detecting signal $S_8$ is supplied to the up and down counter 25G in accordance with the output of the preset data memory 48.

In such manner, the data area is detected in the data area detecting circuit 47 and the starting position of the constant speed area is set in the up and down counter 25G in the second embodiment. Therefore, the relative position of the optical card 11 with respect to the optical head 21 can be detected; and a mounting deviation, which occurs when the optical card 11 is mounted on the shuttle 24, of the optical card 11 with respect to the optical head 21 and a deviation of the optical recording portion 13 on the optical card 11, which is generated when the optical card is manufactured, can be corrected in the recording/reproducing operation of optical information.

Figures 7A, 7B:
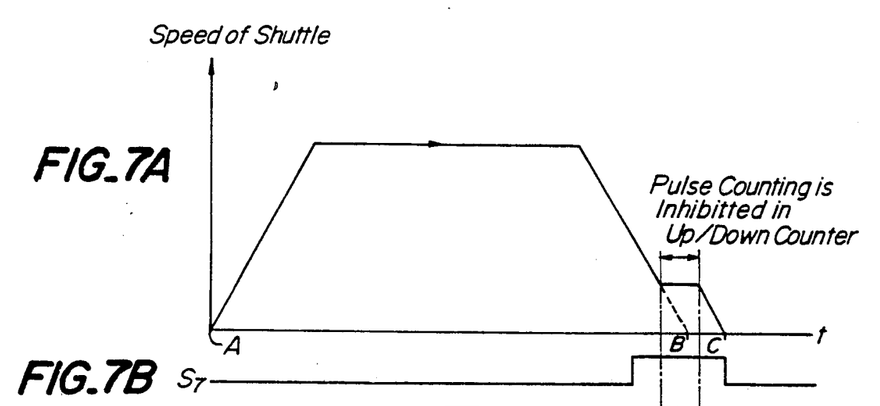
FIGS. 7A to 7D are waveforms for explaining a movement of the apparatus according to the second embodiment.
Figures 7C, 7D:
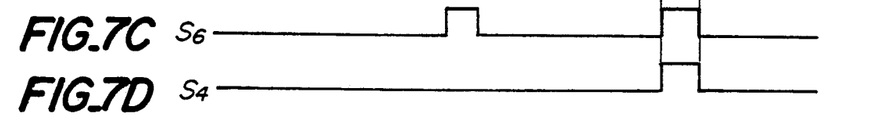

After the shuttle 24 has passed the accelerated area, the shuttle 24 is controlled to move at a constant speed, during which optical information is recorded/reproduced on/from the optical card 11. Thereafter, the moving speed of the shuttle 24 is decreased in the decelerated area in order to change the moving direction of the shuttle 24. When the moving speed of the shuttle 24 is decreased and the shuttle 24 is transferred to in the vicinity of the predetermined stopping position (Point B), the output of the near position detecting circuit 44, i.e. near position signal $S_6$, is activated (FIG. 7B). In the case that a defect is formed in the vicinity of the predetermined stopping position, the output of the defect detecting circuit 45, i.e. defect detecting signal $S_7$, is activated as shown in FIG. 7C. Then the output of the AND circuit 46, in which the logical multiplication of the outputs of the near position detecting circuit 44 and the output of the defect detecting circuit 45 is calculated, is activated to supply a count inhibiting signal $S_4$ to the count inhibiting circuit 42. When the count inhibiting signal $S_4$ is supplied to the count inhibiting circuit 42, the supply of the up-counting pulse and down-counting pulse to the up and down counter 25G is inhibited. During the supply of the pulses are inhibited, pulse counting is not conducted in the up and down counter 25G and the pulse counting is started again after the signal level of the count inhibiting signal $S_4$ becomes low. Therefore, the shuttle 24 is not stopped at the predetermined stopping position B and the moving distance of the shuttle 24 is extended to the point C (FIG. 7A). In such manner, when the defect is detected in the vicinity of the stopping position B, it is arranged such that the shuttle 24 is not stopped at the predetermined stopping position where the defect is formed and the actual stopping position of the shuttle 24 is deviated from the predetermined stopping position B.

When the actual stopping position of the shuttle 24 is deviated from the predetermined stopping position, the relative positional relationship between the optical head 21 and the optical card 11 is also deviated. However, after the moving direction of the shuttle 24 has been changed, the preset data memorized in the preset data memory 48 is also changed in accordance with the change of the driving direction signal $S_2$ supplied from the controller 28. In other word, the top position of the ID portion 14B (14A) is set up in the up and down counter 25G when the top end portion of the ID portion 14B (14A) is detected by the data area detecting circuit 47. Therefore, the extension of the moving distance of the shuttle 24 does not influence to the movement of the apparatus thereafter.

As stated in the above in detail, in the second embodiment, in case that the defect is formed in the vicinity of the predetermined stopping position of the shuttle 24, the apparatus is arranged such that the actual stopping position of the shuttle 24 is deviated from the predetermined stopping position so that the shuttle 24 is not stopped at the position where the defect is formed. Therefore, the tracking servo system serves in an effective manner while the defect is formed at the predetermined stopping position of the shuttle 24; and thus the desired track can be traced correctly by the light beam emanated from the optical head 21. In this case, the actual stopping position of the shuttle 21 is deviated from the predetermined position, but the deviated moving amount of the shuttle 24 is corrected after the moving direction of the shuttle 24 has been changed so as not to give an influence to the movement of the apparatus by the extension of the moving distance of the shuttle 24 when it is extended.

Figure 8:
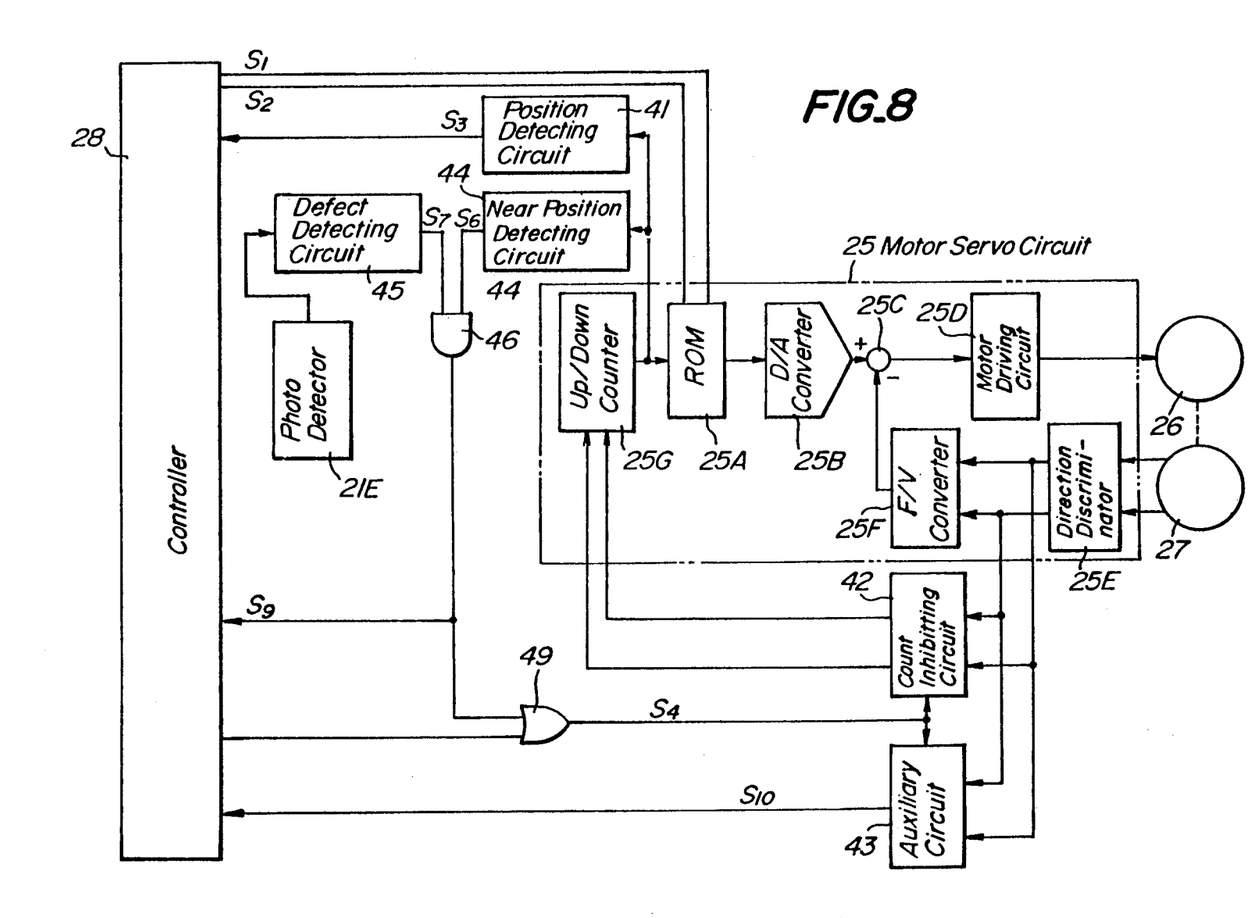
FIG. 8 is a block diagram depicting a construction of the main portion of a third embodiment of the optical information recording/reproducing apparatus according to the invention.

FIG. 8 is a block diagram depicting a construction of the third embodiment according to the invention. In the third embodiment, a near position detecting circuit 44, a defect detecting circuit 45, an AND circuit 46, a count inhibiting circuit 42, an auxiliary counter 43, a position detecting circuit 41 and an OR circuit 49 are provided in addition to the conventional apparatus shown in FIG. 2. The arrangement of the near position detecting circuit 44, the defect detecting circuit 45, the AND circuit 46 and the count inhibiting circuit 42 are the same as those of the apparatus according to the second embodiment; however, in the third embodiment, the output of the AND circuit 46 is supplied to the controller 28 as a stopping position and defect detecting signal $S_9$ as well as to the count inhibiting circuit 42 and to the auxiliary counter 43 via the OR circuit 49. The auxiliary counter 43 serves to count the clock pulses during the supply of the count pulse to the up and down counter 25G is inhibited in accordance with the output of the OR circuit 49; and the number of the pulses counted in the auxiliary counter 43 is supplied to the controller 28 as an auxiliary signal $S_{10}$.

In the position detecting circuit 41, the output of the up and down counter 25G is decoded to produce the positional signal $S_3$ representing the fact that the shuttle 24 becomes to the constant speed area and moves at a constant speed. The positional signal $S_3$ is supplied to the controller 28.

In the controller 28, the count inhibiting signal $S_4$ is produced on the basis of the stopping position and defect detecting signal $S_9$ supplied from the AND circuit 46, the auxiliary signal $S_{10}$ supplied from the auxiliary counter 43 and the positional signal $S_3$ supplied from the position detecting circuit 41; the count inhibiting signal $S_4$ is supplied to the count inhibiting circuit 42 and the auxiliary counter 43 via the OR circuit 49.

The movement of the shuttle 24 in the third embodiment will be explained in the following.

When a defect is detected in the vicinity of the predetermined stopping position of the shuttle 24, the supply of the clock pulse to the up and down counter 25G is inhibited by the count inhibiting circuit 42 to extend the moving amount of the shuttle 24 as the same as the second embodiment; and thus the actual stopping position of the shuttle 24 is deviated from the predetermined stopping position so as not to stop just on the defect. When the supply of the clock pulse is inhibited in the up and down counter 25G, the auxiliary counter 43 works simultaneously to count the number of clock pulse while the supply of the clock pulse is inhibited in the up and down counter 25G; and the number of the clock pulses counted in the auxiliary counter 43 is supplied to the controller 28. Therefore, a distance between the predetermined stopping position of the shuttle 24 and the actual stopping position, i.e. the distance between Point B and Point C in FIG. 7A, can be recognized in the controller 28. Since the output of the AND circuit 46, i.e. signal $S_9$ is also supplied to the controller 28, the direction of the stopping point at which the defect is formed and the driving direction of the shuttle 24 when the stopping position of the shuttle 24 has been deviated can be recognized in the controller 28.

In order to correct the deviation of the relative position of the optical head 21 and the optical card 11, which is caused in that the shuttle 24 is stopped at the position deviated from the predetermined position, the supply of the clock pulses to the up and down counter 25G is inhibited in correspondence with the deviated distance when the shuttle 24 is transferred in the opposite direction. It is desired that the inhibition of the clock pulse supply is conducted during the shuttle 24 moves at a constant speed in order to prevent the influence of the deviation of the stopping position to the motor servo control system. Therefore, the apparatus according to the third embodiment is arranged such that when the shuttle 24 is transferred in the opposite direction after the defect formed on the stopping position of the shuttle has been detected and when the fact that the shuttle 24 is moved at a constant speed is detected in the controller 28, the count inhibiting signal $S_4$ is supplied to the count inhibiting circuit 42 and the auxiliary counter 43 via the OR circuit 49 to inhibit the supply of the clock pulse to the up and down counter 25G. It should be noted that the pulse supply inhibited period corresponds to the deviated distance of the relative position of the optical card 11 and the optical head 21. On the other hand, during the period that the count is inhibited in the up and down counter 25G, the clock pulses are started to be counted in the auxiliary counter 43.

By the operation explained in the above, when the defect is formed just on the predetermined stopping position of the shuttle 24 of the optical card 11, the actual stopping position of the shuttle 24 is deviated from the predetermined stopping position; and thus the tracking servo system serves in a proper manner without being influenced by the defect and the desired track can be kept effectively. Further, the deviated moving amount of the shuttle 24 is corrected when the shuttle 24 is transferred at a constant speed in the opposite direction. Therefore, it is possible to decrease the influence to the motor servo system, which is caused by the correction of the deviated moving amount of the shuttle 24.

The present invention is not limited to the above explained embodiments and so many variations or alternations can be applied therefor. For instance, in the embodiments stated in the above, it is arranged such that when the fact that the shuttle 24 is transferred at a constant speed is detected by the position detecting circuit 41, the pulse counting is inhibited in the up and down counter 25G; however, it may be possible to deviate the stopping position of the shuttle 24 without the position detecting circuit 41. For example, a plurality of driving data for driving the shuttle 24 are preliminarily memorized in the ROM 25A; and when the defect is detected, the data for driving the shuttle for a longer distance may be selected in the ROM 25A.

Further, in the embodiments mentioned in the above, the relative position of the optical card 11 with respect to the optical head 21 is detected with the aid of rotary encoder 27, but a linear encoder may be used therefor.

Furthermore, in the embodiments mentioned in the above, it is arranged such that the shuttle 24 is transferred in the track direction, but it may be possible to arrange such that the optical card 21 is moved in the trance direction with respect to the optical card 21.

Moreover, it may be possible to use not only the optical card having the ID portions at both sides thereof but also the optical card having only one ID portion on one side thereof. In this case, the recording/reproducing optical information is conducted in the movement of the optical card or the optical head in only one direction.

What is claimed is:

1. An optical information recording and/or reproducing apparatus, wherein an information recording medium and an optical head are moved relatively in a track direction in a reciprocal manner to record optical information on the information recording medium and/or reproduce optical information recorded on the information recording medium, comprising:

driving means for moving relatively an optical information recording medium and an optical head in the track direction in a reciprocal manner;

servo means for conducting a servo operation to control a relative moving speed of optical recording medium and the optical head;

stopping position controlling means for conducting a stopping position controlling operation to deviate a topping position of relative movement of the optical information recording medium and the optical head in the track direction by a predetermined distance responsive to deviation of a light beam emanated from said optical head from a desired track in a tracking direction, which is perpendicular to said track direction; and second controlling means for controlling the servo operation conducted in the servo means and for controlling the stopping position controlling operation conducted in the stopping position controlling means.

2. An optical information recording and/or reproducing apparatus, wherein an information recording medium and an optical head are moved relatively in a track direction in a reciprocal manner to record optical information on the information recording medium and/or reproduce optical information recorded on the information recording medium, comprising:

driving means for moving relatively an optical information recording medium and an optical head in the track direction in a reciprocal manner;

servo means for conducting a servo operation to control a relative moving speed of the optical recording medium and the optical head;

defect detecting means for detecting a defect formed on a predetermined stopping position of the relative movement of the optical information recording medium and the optical head, when the optical information recording medium and the optical head are relatively moved in a first direction;

stopping position deviating and correcting means for performing a deviating and correcting operation to deviate a stopping position of relative movement of the optical information recording medium and the optical head by a predetermined distance when a said defect formed on the predetermined stopping position is detected by said defect detecting means; and for correcting a relative moving distance of the optical information recording medium and the optical head, which has been deviated in accordance with said deviating and correcting operation, when the optical information recording medium and the optical head are relatively moved in a second direction which is opposite to said first direction; and controlling means for controlling the servo operation conducted in the servo means and for controlling the deviating and correcting operation for the stopping position conducted in the stopping position deviating and correcting means.

3. An optical information recording and/or reproducing apparatus according to claim 1, wherein:

said driving means comprises a driving motor for driving said optical information recording medium said optical head relatively in the track direction in a reciprocal manner;

said servo means comprises a rotary encoder provided on said driving motor, a direction discriminator for discriminating a moving direction of the relative movement of the optical information recording medium and the optical head, an up and down counter for producing a positional signal representing a position of the optical information recording medium or said optical head in response to an output of said direction discriminator, and a ROM for storing data for driving said motor.

4. An optical information recording and/or reproducing apparatus according to claim 3, wherein:

said stopping position controlling means comprises a position detecting circuit for detecting that the relative moving speed of the optical information recording medium and said optical head becomes constant, means for providing a supply of clock pulses to said up and down counter, a count inhibiting circuit by which said supply of clock pulses is inhibited in said up and down counter in response to a count inhibiting signal from said second controlling means, and an auxiliary counter in which said clock pulses are counted when said count inhibiting signal is supplied to the auxiliary counter from said second controlling means and the supply of clock pulses is inhibited to the up and down counter.

5. An optical information recording and/or reproducing apparatus according to claim 4, wherein:

said second controlling means comprises a controller by which the apparatus is controlled such that when the controller recognizes that a track on said information recording medium traced by a light beam emanated from the optical head is not a desired track, an extension operation is performed wherein a relative moving distance of the optical information recording medium and the optical head is extended to deviate the stopping position of the optical information recording medium or the optical head by a predetermined distance during which the optical information recording medium or the optical head is moved in a first direction.

6. An optical information recording and/or reproducing apparatus according to claim 5, wherein:

said extension operation of the relative moving distance of the optical information recording medium and the optical head is conducted while the optical information recording medium and the optical head are transferred relatively at a constant speed in the first direction and a second direction.

7. An optical information recording and/or reproducing apparatus according to claim 3, wherein:

said stopping position controlling means comprises a near position detecting circuit for detecting that the relative position of the optical information recording medium and said optical head becomes near a predetermined stopping position, a defect detecting circuit by which a defect formed on said track, along which a light beam emanated from said optical head is traced, is detected, an AND circuit in which a logical multiplication of outputs of said near position detecting circuit and said defect detecting circuit is calculated, means for providing a supply of clock pulses to said up and down counter, and a count inhibiting circuit by which the supply of clock pulses to said up and down counter is inhibited in response to an output of said AND circuit.

8. An optical information recording and/or reproducing apparatus according to claim 7, wherein:

said second controlling means comprises a controller by which the apparatus is controlled such that when the relative position of the optical information recording medium and the optical head becomes near to said predetermined stopping position of the optical information recording medium and the optical head relative to one another and a defect formed on the predetermined stopping position is detected by the defect detecting circuit, an extension operation is performed wherein a relative moving distance of the optical information recording medium and the optical head is extended to deviate the stopping position of the optical information recording medium and the optical head relative to one another by a predetermined distance during which the optical information recording medium and the optical head are moved relatively in a first direction.

9. An optical information recording and/or reproducing apparatus according to claim 8, wherein:
said extension operation of the relative moving distance of the optical information recording medium and the optical head is conducted while the optical information recording medium and the optical head are transferred relatively at a constant speed in the first direction and a second direction.

10. An optical information recording and/or reproducing apparatus according to claim 3, wherein:
said apparatus further comprises a data area detecting means for detecting that the relative position of the optical information recording medium and the optical head becomes one of a plurality of portions formed on said optical information recording medium; and a preset data memory for preliminarily memorizing positional data at which relative movement between the optical information recording medium and the optical head should be started to cause relative movement therebetween at a constant speed.

11. An optical information recording and/or reproducing apparatus according to claim 10, wherein counting-up or counting-down of the clock pulses is started in the up and down counter in accordance with an output of said preset data memory when the output of said data area detecting circuit is supplied to the up and down counter.

12. An optical information recording and/or reproducing apparatus according to claim 3 wherein:
said stopping position controlling means comprises a position detecting circuit for detecting that the relative moving speed of the optical information recording medium and said optical head becomes constant, a near position detecting circuit for detecting that the relative position of the optical information recording medium and said optical head becomes near a predetermined stopping position, a defect detecting circuit by which a defect formed on said track, along which a light beam emanated from said optical head is traced, is detected, an AND circuit in which a logical multiplication of outputs of said near position detecting circuit and said defect detecting circuit is calculated, an OR circuit in which a logical addition of an output of said AND circuit and count inhibiting signal supplied from the second controlling means is calculated, a count inhibiting circuit from which count inhibiting signals for inhibiting counting up or counting down is supplied to said up and down counter in response to an output of said OR circuit, means for providing a supply of clock pulses to said up and down counter, and an auxiliary counter in which said clock pulses are counted when said count inhibiting signal is supplied to the auxiliary counter from said OR circuit, while the supply of the clock pulses to the up and down counter is inhibited.

13. An optical information recording and/or reproducing apparatus according to claim 12 wherein:
said second controlling means comprises a controller by which the apparatus is controlled such that when the relative position of the optical information recording medium and the optical head becomes near the predetermined stopping position, and when a defect formed on the predetermined stopping position is detected by the defect detecting circuit, the relative moving distance of the optical information recording medium and the optical head is extended by a predetermined distance; while said controller recognizes an extended distance from the auxiliary counter and a moving direction of the relative movement of the optical information recording medium and the optical head when the defect is detected; and the extended distance is corrected after the relative moving distance of the optical information recording medium and the optical head has been changed to the second direction.

14. An optical information recording and/or reproducing apparatus according to claim 2, wherein:
said driving means comprises a driving motor for driving said optical information recording medium or said optical head in the track direction in a reciprocal manner;
said servo means comprises a rotary encoder provided on said driving motor, a direction discriminator for discriminating a moving direction of the relative movement of the optical information recording medium and the optical head an up and down counter for producing a positional signal representing a relative position of the optical information recording medium and said optical head in response to an output of said direction discriminator, and a rom for storing data for driving said motor.

15. An optical information recording and/or reproducing apparatus according to claim 2, wherein:
said stopping position deviating and correcting means comprises a position detecting circuit for detecting that the relative moving speed of the optical information recording medium and said optical head becomes constant, means for providing a supply of clock pulses to said up and down counter, a count inhibiting circuit by which said supply of clock pulses is inhibited in said up and down counter in response to a count inhibiting signal from said controlling means, and an auxiliary counter in which said clock pulses are counted when said count inhibiting signal is supplied to the auxiliary counter from said controlling means and the supply of clock pulses is inhibited to the up and down counter.

16. An optical information recording and/or reproducing apparatus according to claim 15, wherein:
said controlling means comprises a controller by which the apparatus is controlled such that when the controller recognizes that a track on said information recording medium traced by a light beam emanated from the optical head is not a desired track, an extension operation is performed wherein a relative moving distance of the optical information recording medium and the optical head is extended to deviate the stopping position of the optical information recording medium and the optical head relative to one another by a predetermined distance during which the optical information recording medium and the optical head are moved relative to one another in a first direction.

17. An optical information recording and/or reproducing apparatus according to claim 16, wherein:
said extension operation of the relative moving distance of the optical information recording medium and the optical head is conducted while the optical information recording medium and the optical head are transferred relatively at a constant speed in the first direction and a second direction.

18. An optical information recording and/or reproducing apparatus according to claim 14, wherein:
said stopping position deviating and correcting means comprises a near position detecting circuit for detecting that the relative position of the optical information recording medium and said optical head becomes near a predetermined stopping position, a defect detecting circuit by which a defect formed on said track, along which a light beam emanated from said optical head is traced, is detected, and AND circuit in which a logical multiplication of outputs of said near position detecting circuit and said defect detecting circuit is calculated, means for providing a supply of clock pulses to said up and down counter, and a count inhibiting circuit by which the supply of clock pulses to said up and down counter is inhibited in response to an output of said AND circuit.

19. An optical information recording and/or reproducing apparatus according to claim 18, wherein:
said controlling means comprises a controller by which the apparatus is controlled such that when the relative position of the optical information recording medium and the optical head becomes near to the predetermined stopping position of the optical information recording medium and the optical head relative to one another and a defect formed on the predetermined stopping position is detected by the defect detecting circuit, an extension operation is performed wherein a relative moving distance of the optical information recording medium and the optical head is extended to deviate the stopping position of the optical information recording medium and the optical head relative to one another by a predetermined distance during which the optical information recording medium and the optical head are moved relatively in a first direction.

20. An optical information recording and/or reproducing apparatus according to claim 19, wherein:
said extension operation of the relative moving distance of the optical information recording medium and the optical head is conducted while the optical information recording medium and the optical head are transferred relatively at a constant speed in the first direction and a second direction.

21. An optical information recording and/or reproducing apparatus according to claim 14, wherein:
said apparatus further comprises a data area detecting means for detecting that the relative position of the optical information recording medium and the optical head becomes one of a plurality of portions formed on said optical information recording medium; and a preset data memory for preliminarily memorizing positional data at which relative movement between the optical information recording medium and the optical head should be started to cause relative movement therebetween at a constant speed.

22. An optical information recording and/or reproducing apparatus according to claim 21, wherein:
counting-up or counting-down of the clock pulses is started in the up and down counter in accordance with an output of said preset data memory when the output of said data area detecting circuit is supplied to the up and down counter.

23. An optical information recording and/or reproducing apparatus according to claim 14 wherein:
said stopping position deviating and correcting means comprises a position detecting circuit for detecting that the relative moving speed of the optical information recording medium and said optical head becomes constant, a near position detecting circuit for detecting that the relative position of the optical information recording medium and said optical head becomes near a predetermined stopping position, a defect detecting circuit by which a defect formed on said track, along which a light beam emanated from said optical head is traced, is detected, an AND circuit in which a logical multiplication of outputs of said near position detecting circuit and said defect detecting circuit is calculated, an OR circuit in which a logical addition of an output of said AND circuit and a count inhibiting signal supplied from the controlling means is calculated, a count inhibiting circuit from which count inhibiting signals for inhibiting counting up or counting down is supplied to said up and down counter in response to an output of said OR circuit, means for providing a supply of clock pulses to said up and down counter, and an auxiliary counter in which said clock pulses are counted when said count inhibiting signal is supplied to the auxiliary counter from said OR circuit, while the supply of the clock pulses to the up and down counter is inhibited.

24. An optical information recording and/or reproducing apparatus according to claim 23 wherein:
said controlling means comprises a controller by which the apparatus is controlled such that when the relative position of the optical information recording medium and the optical head becomes near the predetermined stopping position, and when a defect formed on the predetermined stopping position is detected by the defect detecting circuit, the relative moving distance of the optical information recording medium and the optical head is extended by a predetermined distance; while said controller recognizes an extended distance from the auxiliary counter and a moving direction of the relative movement of the optical information recording medium and the optical head when the defect is detected; and the extended distance is corrected after the relative moving distance of the optical information recording medium and the optical head has been changed to the second direction.

* * * * *

UNITED STATES PATENT AND TRADEMARK OFFICE
CERTIFICATE OF CORRECTION

PATENT NO. : 5,105,072
DATED : April 14, 1992
INVENTOR(S) : Akito SAITO et al

It is certified that error appears in the above-identified patent and that said Letters Patent is hereby corrected as shown below:

Column 13, line 6, "topping" should read --stopping--.

Signed and Sealed this

Fifth Day of October, 1993

*Attest:*

BRUCE LEHMAN

*Attesting Officer*  Commissioner of Patents and Trademarks